(12) United States Patent
Neumann et al.

(10) Patent No.: US 7,817,405 B2
(45) Date of Patent: Oct. 19, 2010

(54) PORTABLE ELECTRICAL DISTRIBUTION ENCLOSURE

(76) Inventors: Barry Neumann, 36 Ludlow St., Stamford, CT (US) 06902; Carmelo Balbi, 36 Ludlow St., Stamford, CT (US) 06902

( * ) Notice: Subject to any disclaimer, the term of this patent is extended or adjusted under 35 U.S.C. 154(b) by 233 days.

(21) Appl. No.: 12/289,524

(22) Filed: Oct. 29, 2008

(65) Prior Publication Data

US 2010/0103592 A1   Apr. 29, 2010

(51) Int. Cl.
*H02B 1/26* (2006.01)
*H02G 3/08* (2006.01)
*A47B 81/00* (2006.01)
*B65D 88/76* (2006.01)

(52) U.S. Cl. .................. 361/625; 361/658; 361/641; 174/17 R; 174/50; 174/57; 174/58; 312/223.1; 312/223.6; 220/484

(58) Field of Classification Search .......... 361/658, 361/641, 625; 174/17 R, 50, 57, 58; 312/223.1, 312/223.6; D13/110; 220/484
See application file for complete search history.

(56) References Cited

U.S. PATENT DOCUMENTS

| | | | | |
|---|---|---|---|---|
| 2,988,655 A | * | 6/1961 | Rudolph et al. ............. | 307/114 |
| 2,995,670 A | * | 8/1961 | Weiss .......................... | 307/112 |
| 3,004,175 A | * | 10/1961 | Weiss .......................... | 307/147 |
| 3,786,312 A | * | 1/1974 | Roussard ..................... | 361/643 |
| 3,851,226 A | * | 11/1974 | Chen .......................... | 361/646 |
| 3,946,282 A | * | 3/1976 | Weiss et al. .................. | 361/77 |
| 4,318,156 A | * | 3/1982 | Gallagher .................... | 361/647 |
| 5,035,630 A | * | 7/1991 | Norsworthy ................. | 439/92 |
| D342,814 S | * | 12/1993 | Bergeron ..................... | D32/70 |
| 6,657,123 B2 | | 12/2003 | Moore | |
| 6,657,861 B2 | | 12/2003 | Irmer | |
| 7,304,852 B2 | * | 12/2007 | Hernandez et al. .......... | 361/714 |
| 7,442,873 B2 | * | 10/2008 | McCormick et al. ......... | 174/50 |
| 2005/0013065 A1 | | 1/2005 | Kersten | |
| 2010/0123997 A1 | * | 5/2010 | Gerber ....................... | 361/625 |

* cited by examiner

*Primary Examiner*—Zachary M Pape
(74) *Attorney, Agent, or Firm*—Richard C. Litman

(57) ABSTRACT

The portable electrical distribution enclosure is a chassis made of anodized aluminum. The chassis has a bottom panel and two side panels. The two side panels extend parallel to each other and at right angles from the bottom panel, making the chassis rectangular. The enclosure further includes high density polyethylene front and rear panels with legs extending below the bottom panel. The front and rear legs insure that the chassis is off the ground to permit air to flow under the chassis and into vents to cool the chassis during use of the portable electrical distribution enclosure. There is also a high density polyethylene top with at least one handle. The high density polyethylene can withstand high impacts or collateral damage from surrounding environment, weather, or marine applications. Additionally, it is lightweight and nonconductive.

14 Claims, 5 Drawing Sheets pa# PORTABLE ELECTRICAL DISTRIBUTION ENCLOSURE

BACKGROUND OF THE INVENTION

1. Field of the Invention

The present invention relates to boxes for housing electrical equipment, and particularly to a portable electrical distribution enclosure made of anodized aluminum sheet metal and molded polyethylene for providing a strong lightweight housing able to withstand collateral impacts and for protecting electrical components therein.

2. Description of the Related Art

It is often necessary to provide temporary electrical power for operating lights, tools, and other devices at the same time when permanent power distribution facilities have not yet been installed or are out of service due to an electrical failure. Sometimes, the temporary power distribution must be carried through or used in confined spaces that do not afford much room. This is especially true in building or repair jobs at construction sites or other workplaces such as shipyards where electrical power is needed on vessels that are being constructed or repaired. Prior designs were made from steel or other conductive material that created an unsafe environment during shortages or malfunctions. Even those made from rubber tended to generate heat from electrical currents that caused problems such gas out and fires. The power distribution enclosure must be light, easily portable, rugged, and able to withstand collateral impacts while protecting the integrity of inner assembled electrical components. Thus, a portable, electrical distribution enclosure solving the aforementioned problems is desired.

SUMMARY OF THE INVENTION

The portable electrical distribution enclosure has a chassis made of anodize aluminum. The chassis has a bottom panel and two side panels. The two side panels extend parallel to each other and at right angles from the bottom panel making the chassis rectangular. The enclosure further includes high density polyethylene front and rear panels. The front and rear panels receive the chassis and securely connect to the bottom panel and each of the two side panels of the chassis. The front panel and the rear panel each have a pair of legs extending below the bottom panel. The front and rear legs insure that the chassis is off the ground to permit air to flow under the chassis and into vents to cool the chassis during use of the portable electrical distribution enclosure.

There is also a high density polyethylene (HDPE) top with at least one handle. The handle permits the enclosure to be readily portable because of the lightweight material. The high density polyethylene top securely connects to the two side panels of the chassis and to the front and rear panels. The high density polyethylene panels and top can withstand high impacts and any collateral damage from surrounding environment, weather, or marine applications. Thus, the high density polyethylene panels and top protect the inner electrical components mounted in the chassis, as well as any protruding receptacles and outlets.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
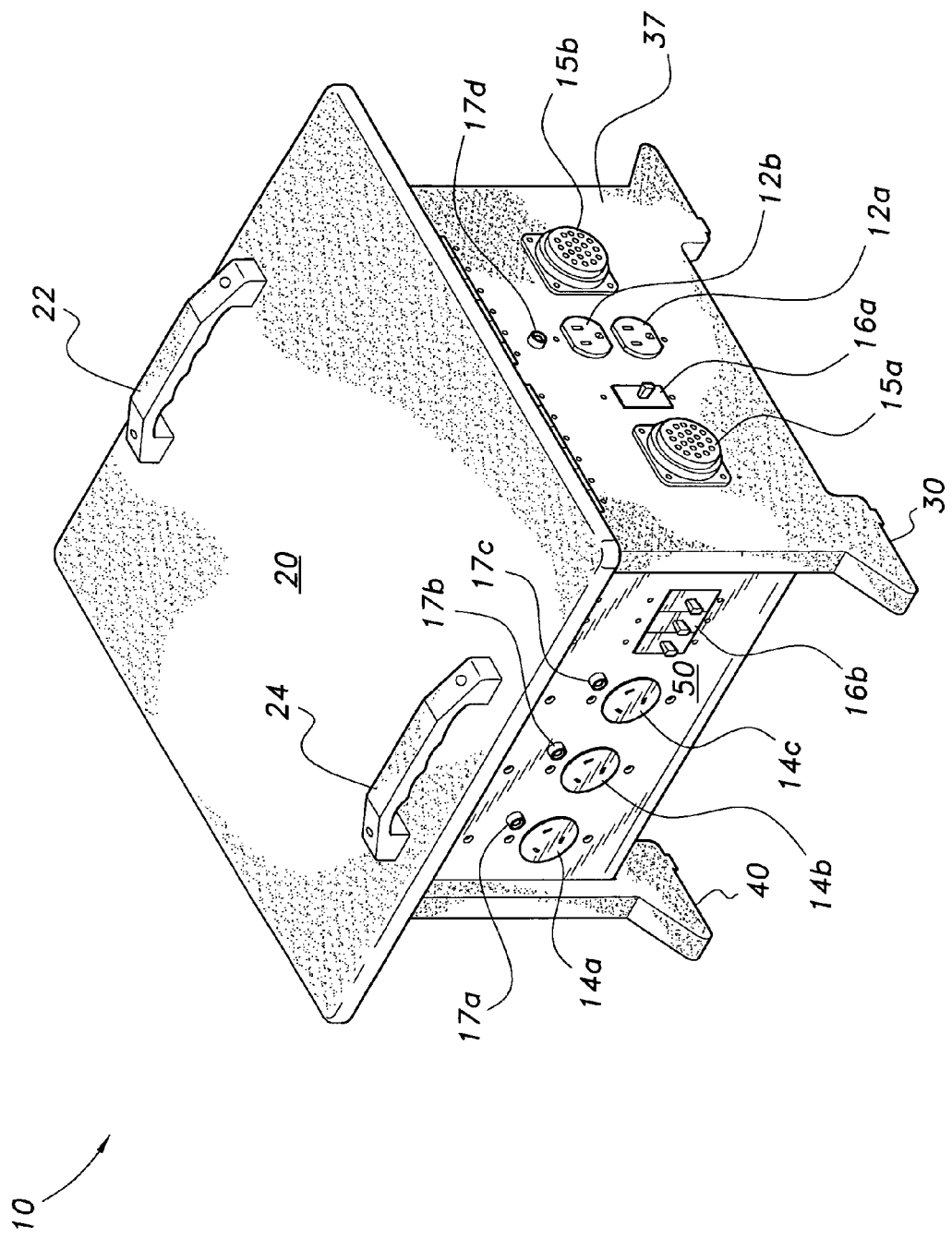
FIG. 1 is a top front perspective view of a portable electrical distribution enclosure according to the present invention.
Figure 2:
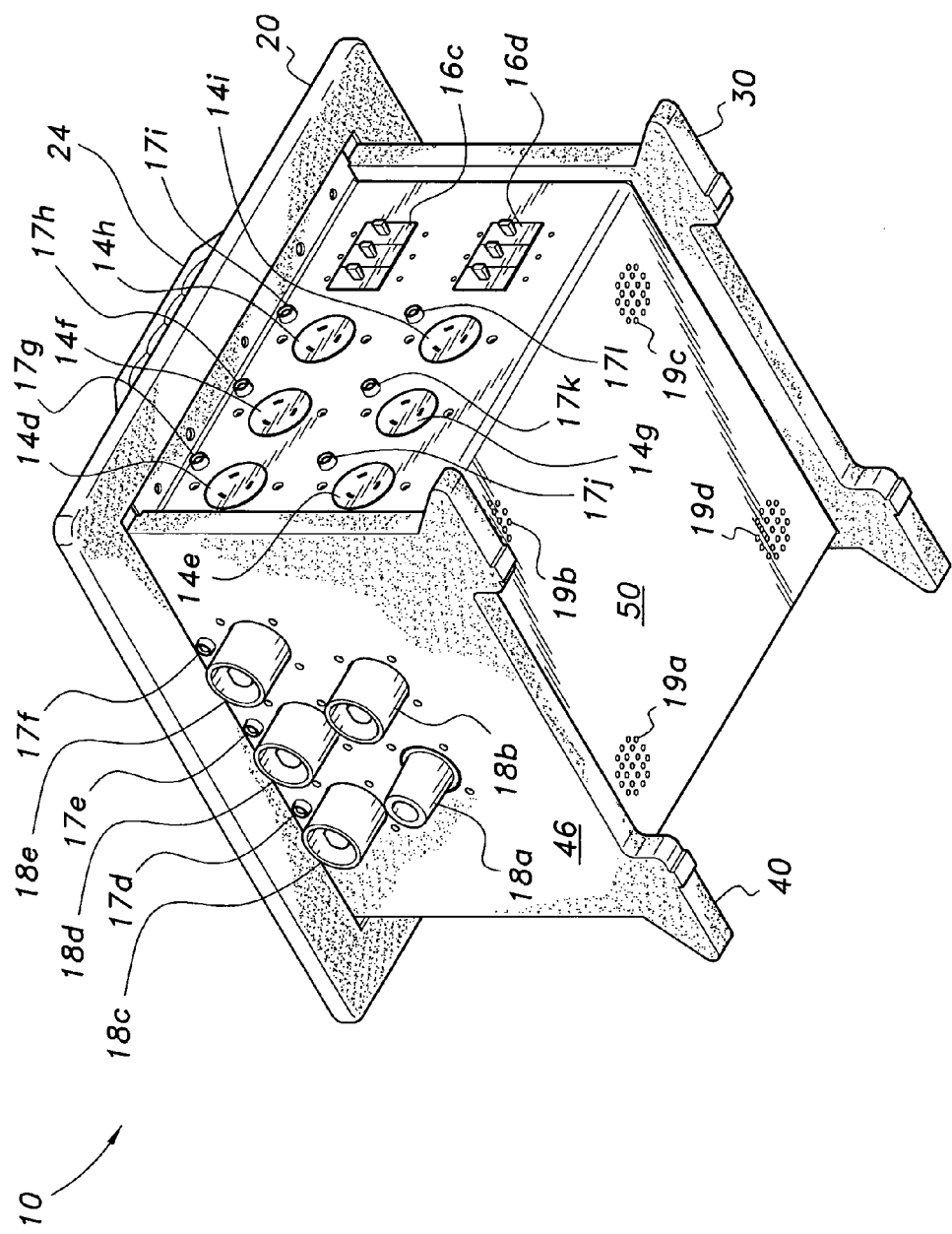
FIG. 2 is a bottom rear perspective view of the portable electrical distribution enclosure according to the present invention.

FIGS. 1 and 2 illustrate top and bottom perspective views of an embodiment of the portable electrical distribution enclosure, generally indicated with the number 10. This enclosure 10, although shown as having a box shape, can also be rectangular in shape as well. The shape of the enclosure 10 is merely dependent on use and necessities for the distribution of electrical power.

The portable power distribution enclosure 10 is for containing electrical components and associated circuitry. These components and associated circuitry provide an interface for the distribution of electrical power from a high voltage source to low voltage source or in feed through type voltage applications. UL equipment can also be used. Thus, the present invention should not be limited to one particular shape or size as long as the enclosure 10 remains portable, rugged, and useful in confined spaces such as construction sites, workplaces, aboard ships, or nearly anywhere permanent power facilities are unavailable or out of service.

As shown in FIGS. 1 and 2, the enclosure 10 includes several outlet receptacles 12a, 12b, 14a, 14b, 14c, 14d, 14e, 14f, 14g, 14h, 14i and other electrical components 15a, 15b, 16, 16b, 16c, 16d, 17a, 17b, 17c, 17d, 17e, 17f, 17g, 17h, 17i, 17j, 17l, 18a, 18b, 18c, 18d, 18e for facilitating connections to power many different types of electrical equipment. The enclosure 10 additionally has several vents 19a, 19b, 19c, 19d on a bottom panel 56 of a chassis 50, so that any condensation forming in the enclosure 10 can be collected and drained through these vents 19a, 19b, 19c, 19d thereby preventing moisture damage to the interior circuitry, the electrical components, and the receptacles. The vents 19a, 19b, 19c, 19d will also permit airflow to circulate in the enclosure 10 for cooling purposes, thus anticipating any heat generated from the flowing electrical current.

The portable power distribution enclosure 10 further includes a rectangular top 20 with a pair of handles 22, 24 securely mounted to the top 20. The handles 22, 24 are for transporting, lifting, and moving the enclosure 10. The top 20 and the handles 22, 24 are made of high density polyethylene or HDPE. Polyethylene or polythene is a thermoplastic commodity heavily used in consumer products. As is well known, HDPE is defined by a density greater or equal to 0.941 g/cm$^3$ and can be produced by chromium/silica catalyst, Ziegler-Natta catalyst, or metallocene catalyst. HDPE is used in products and packaging such as milk jugs, detergent bottles, margarine tubs, garbage containers, and water pipes. HDPE material is durable, lightweight, and, as set forth in the present invention, can function as an electrically insulate. Thus, the non-conductive top 20 and handles 22, 24, made from HDPE, act as insulates for the enclosure 10 and minimizes electrical shocks as well as other electrical concerns during the handling or use of the enclosure 10.

Figure 3:
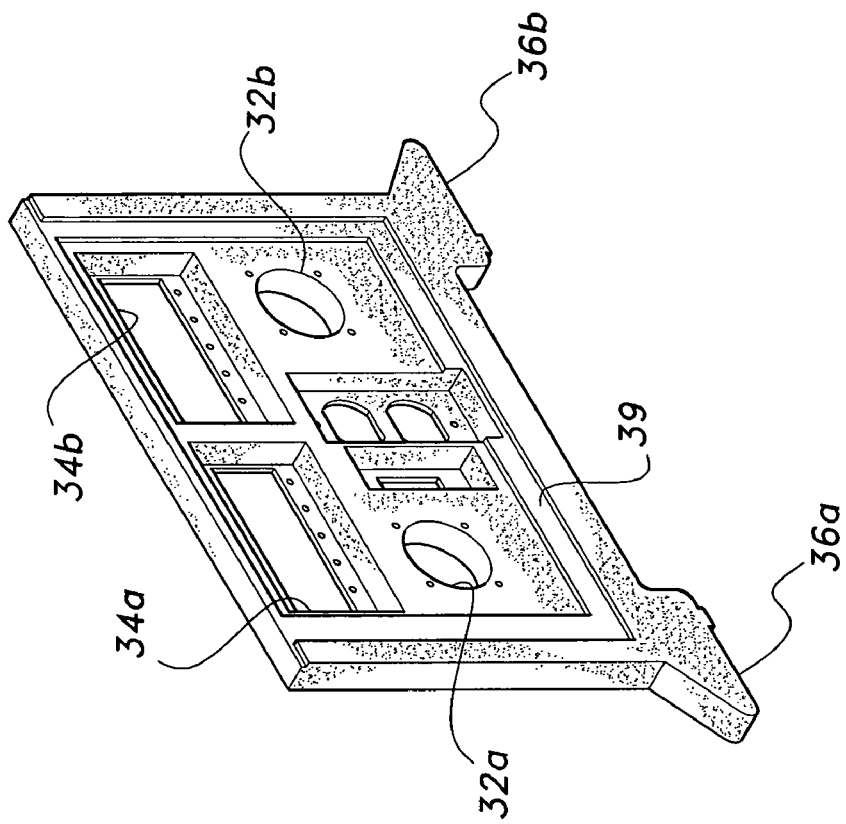
FIG. 3 is a perspective view of an inner side of a front panel for the portable electrical distribution enclosure according to the present invention.
Figure 4:
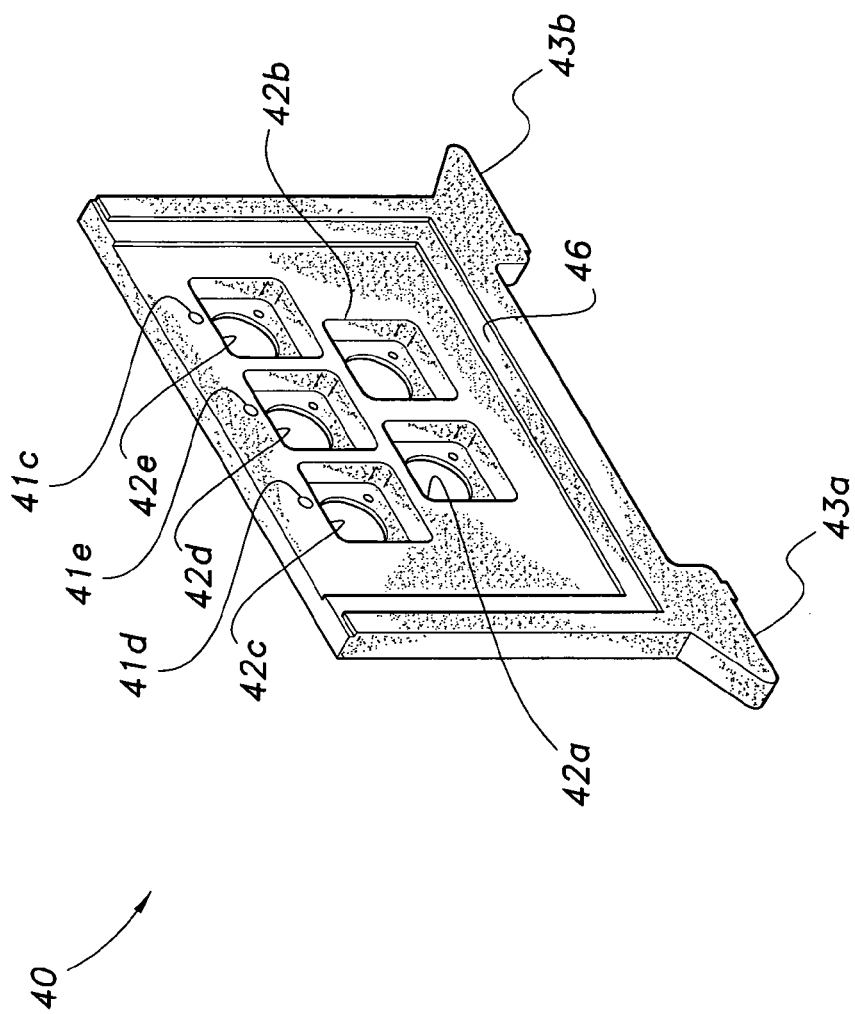
FIG. 4 is a perspective view of inner side of a rear panel for the portable electrical distribution enclosure according to the present invention.

With reference now to FIGS. 3 and 4, two other parts of the enclosure 10 are shown. One of the parts is a front panel 30 and the other part is a rear panel 40. The front panel 30 and the rear panel 40 are also made of HDPE and insulate the enclosure 10 as well as minimize electrical shocks. The front panel 30 and the rear panel 40 are nearly identical in shape and size. The differences are found, in the type of cutouts for the electrical outlets, components, and switches in the respective panel.

As shown in FIG. 3, the front panel 30 has an outlet cutout 31 for the electrical outlets 12a, 12b. The front panel 30 has two component cutouts 32a, 32b for the electrical components 15a, 15b. The front panel 30 has two cutouts 34a, 34b positioned above the other cutouts for two other rectangular type inputs. Additionally, the front panel 30 has a switch cutout 35a for the switch 16. As shown in FIG. 4, the rear panel 40 has small cutouts 41d, 41e, 41f, for the small female plugs 17d, 17e, 17f, and large cutouts 42a, 42 b, 42c, 42d, 42e, for the large female plugs 18a, 18b, 18c, 18d, 18e. It should be noted that the shape and size of a cutout is only for illustration purposes in the preferred embodiment of the present invention. The enclosure 10 with the panels 30, 40 can have other types outlets, cutouts, or receptacles for providing power to particular equipment, tools, or other electrical components during use of the portable electrical distribution enclosure 10.

Both the front panel 30 and the rear panel 40 are rectangular shaped with each having a pair of legs 36a, 36b and 43a, 43b. The legs 36a, 36b and 43a, 43b are similarly shaped. The legs 36a, 36b and 43a, 43b, being made of HDPE, provide a shock absorbing function, if the enclosure 10 is dropped or roughly placed into position. Additionally, the panels 30, 40 have a smooth outer face. The front panel 30 and rear panel 40 are aligned in parallel with each other in the assembled enclosure 10.

As shown in FIGS. 3 and 4, an inner face 38, 45 of both panels includes an inner ridge or groove 39, 46 for receiving the chassis 50. The inner ridges or grooves 39, 46 together with the legs 36a, 36b and 43a, 43b insure that the chassis 50 is off the ground and raised up above the legs 36a, 36b and 43a, 43b so that air can flow under and into the vents 19a-19d positioned on the chassis 50 for cooling the inner electrical components. Alternatively, the raised chassis 50 permits the air to circulate around the enclosure 10. More importantly, the legs 36a, 36b and 43a, 43b of the enclosure 10 keep the chassis 50 off the ground and away from moisture or other wet conditions. Additionally, since the front panel 30 and rear panel 40 are made from high density polyethylene, they can withstand high impacts or any collateral damage from surrounding environment, weather, or marine applications. Thus, the HDPE front panel 30 and rear panel 40 protect the inner electrical components that are mounted in the chassis 50, as well as the protruding receptacles and outlets.

Figure 5:
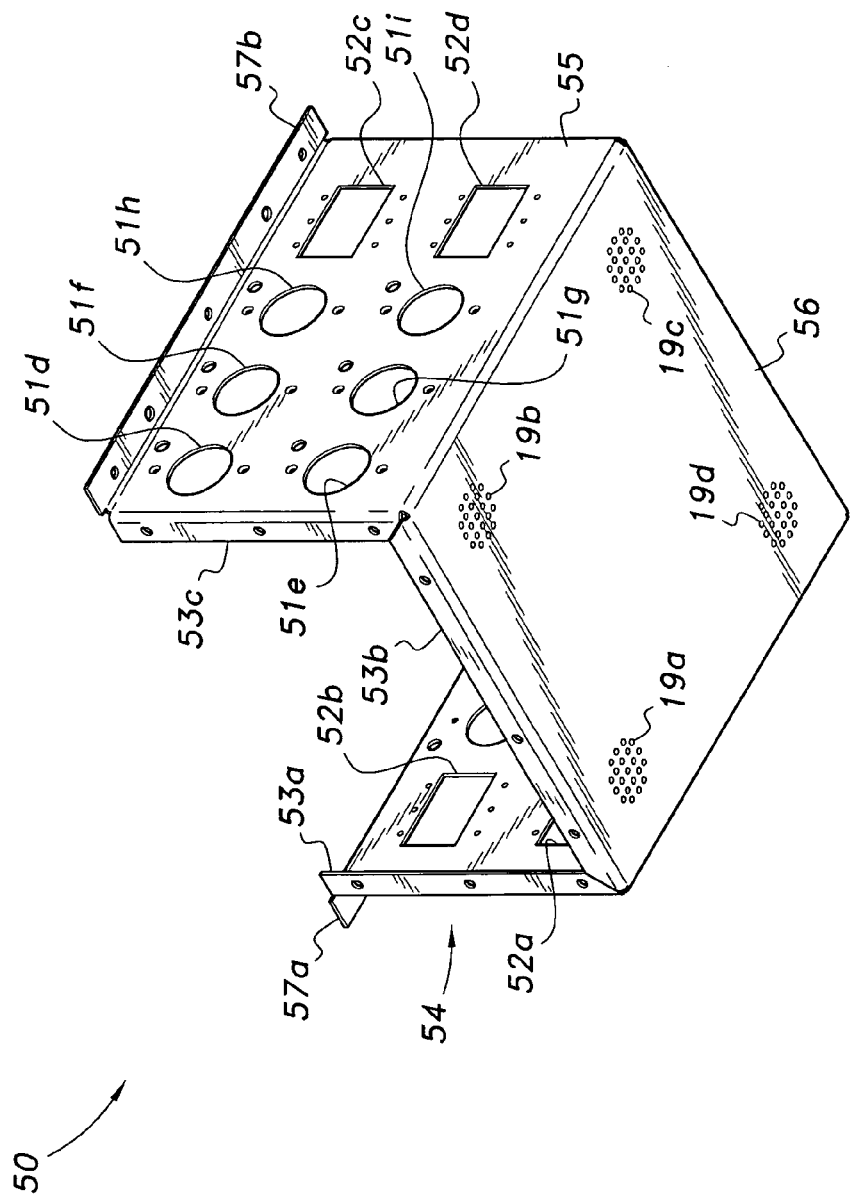
FIG. 5 is a perspective view of a chassis for the portable electrical distribution enclosure according to the present invention.

With respect to FIG. 5, the chassis 50 is shown. The chassis 50 is made out anodize aluminum for electrical installation with a second layer of coating applied to it, such as black anodized aluminum. The aluminum chassis 50 is very strong and the electrical components can be mounted tightly and safely inside with the receptacles and outlets protruding. The chassis 50 is fabricated from an aluminum sheet (5052-H32). It is formed with a rectangular cross-sectional shape with three panels 54, 55, 56 being rectangular and the two side panels 54, 56 extending at right angles from the bottom panel 55.

The chassis 50 is hard anodized for electrical insulation, and powder coated for additional insulation and finish. The chassis 50 has a series of circular cutouts 51e, 51f, 51g, 51h, 51i for receiving electrical outlets 14e, 14f, 14g, 14h, 14i. The chassis 50 has rectangular cutouts 52a, 52b, 52c, 52d for receiving the switches 16a, 16b, 16c, 16d. To securely fasten to the panels 30 and 40, the chassis 50 has inner bent tabs 53a, 53b, 53c that are bent inward at right angles to the respective panel 54, 55, 56. These inner bent tabs 53a, 53b, 53c securely fit into the inner ridge 39 of the front panel 30 and into the inner ridge 46 the rear panel 40, respectively. To securely attach the top 20, the chassis 50 includes two outwardly bent tables 57a, 57b that are also at right angles from the respective panel 54 and 55. Additionally, as previously discussed, several vents 19a, 19b, 19c, 19d are on the bottom panel 56 of the chassis 50, so that condensation that forms will be collected and drained through these vents 19a, 19b, 19c, 19d thereby preventing any moisture damage to the interior circuitry and electrical components. With these vents 19a, 19b, 19c, 19d, air will flow and circulate through the enclosure 10 to cool the heat generated from any electrical current.

It is to be understood that the present invention is not limited to the embodiment described above, but encompasses any and all embodiments within the scope of the following claims.

We claim:

1. A portable electrical distribution enclosure, comprising:
   a chassis having a bottom panel and two side panels extending parallel to each other and at right angles from the bottom panel;
   a high density polyethylene front panel having a pair of front legs, the front panel receiving the chassis and being securely connected to the bottom panel and each of the two side panels of the chassis, the pair of front legs extending below the bottom panel, the front panel having at least one front panel cutout adapted for mounting at least one electric receptacle;
   a high density polyethylene rear panel having a pair of rear legs, the rear panel receiving the chassis and being securely connected to the bottom panel and each of the two side panels of the chassis, the pair of rear legs extending below the bottom panel parallel to the pair of front legs, the rear panel having at least one cutout adapted for mounting at least one electric receptacle; and
   a high density polyethylene top having at least one handle for moving and lifting the portable electrical distribution enclosure, the high density polyethylene top being securely connected to the two side panels of the chassis and to the front and rear panels, the top being positioned parallel to the bottom panel.

2. The portable electrical distribution enclosure according to claim 1, wherein the two side panels have at least one side panel cutout adapted for mounting at least one electric side receptacle, the bottom panel having at least one air vent for facilitating air circulation through the chassis.

3. The portable electrical distribution enclosure according to claim 2, wherein the chassis is made of anodized aluminum.

4. The portable electrical distribution enclosure according to claim 3, further comprising a plurality of electrical components and receptacles extending from each of the at least one cutouts for providing an interface for the distribution of power.

5. The portable electrical distribution enclosure according to claim 4, wherein the pair of front legs and the pair of rear legs raise the chassis off the ground, permitting air to flow under the chassis and into the at least one vent to cool the chassis during use of the portable electrical distribution enclosure.

6. A portable electrical distribution enclosure, comprising:
a chassis forming a rectangular cross section, the chassis having a bottom panel and two side panels extending parallel to each other and at right angles from the bottom panel;
a high density polyethylene front panel having a pair of front legs, the front panel receiving the chassis and being securely connected to the bottom panel and each of the two side panels of the chassis, the pair of front legs extending below the bottom panel, the front panel having at least one front panel cutout adapted for mounting at least one electric receptacle;
a high density polyethylene rear panel having a pair of rear legs, the rear panel receiving the chassis and being securely connected to the bottom panel and each of the two side panels of the chassis, the pair of rear legs extending below the bottom panel parallel to the pair of front legs, the rear panel having at least one cutout adapted for mounting at least one electric receptacle; and
a high density polyethylene top having at least one handle for moving and lifting the portable electrical distribution enclosure, the high density polyethylene top being securely connected to the two side panels of the chassis and to the front and rear panels, the top being positioned parallel to the bottom panel.

7. The portable electrical distribution enclosure according to claim 6, wherein the two side panels have at least one side panel cutout adapted for mounting at least one electric side receptacle, the bottom panel having at least one air vent for facilitating air circulation through the chassis.

8. The portable electrical distribution enclosure according to claim 6, wherein the chassis is made of anodized aluminum.

9. The portable electrical distribution enclosure according to claim 7, further comprising a plurality of electrical components and receptacles extending from each of the at least one cutouts for providing an interface for the distribution of power from a high voltage source to low voltage source.

10. The portable electrical distribution enclosure according to claim 7, wherein the pair of front legs and the pair of rear legs raise the chassis off the ground, permitting air to flow under the chassis and into the at least one vent to cool the chassis during use of the portable electrical distribution enclosure.

11. A portable electrical distribution enclosure, comprising:
a chassis having a rectangular cross section, the chassis having a bottom panel and two side panels extending parallel to each other and at right angles from the bottom panel, the two side panels having at least one side panel cutout adapted for mounting at least one electric side receptacle, the bottom panel having at least one air vent for facilitating air circulation through the chassis;
a front high density polyethylene panel having a pair of front high density polyethylene legs, the front panel receiving the chassis and being securely connected to the bottom panel and each of the two side panels of the chassis, the pair of front legs extending below the bottom panel, the front panel having at least one front panel cutout adapted for mounting at least one electric receptacle;
a rear high density polyethylene panel having a pair of rear high density polyethylene legs, the rear panel receiving the chassis and being securely connected to the bottom panel and each of the two side panels of the chassis, the pair of rear legs extending below the bottom panel parallel to the pair of front legs, the rear panel having at least one cutout adapted for mounting at least one electric receptacle;
a rectangular high density polyethylene top securely connected to the two side panels of the chassis and to the front and rear panels, the top being positioned parallel with the bottom panel; and
at least one high density polyethylene handle securely connected to the top for moving and lifting the portable electrical distribution enclosure.

12. The portable electrical distribution enclosure according to claim 11, wherein the chassis is made of anodized aluminum.

13. The portable electrical distribution enclosure according to claim 12, further comprising a plurality of electrical components and receptacles extending from each of the at least one cutouts for providing an interface for the distribution of power from a high voltage source to low voltage source.

14. The portable electrical distribution enclosure according to claim 11, wherein the pair of front legs and the pair of rear legs raise the chassis off the ground, permitting air to flow under the chassis and into the at least one vent to cool the chassis during use of the portable electrical distribution enclosure.

* * * * *